US010745134B2

(12) United States Patent
Truemper (10) Patent No.: US 10,745,134 B2
(45) Date of Patent: Aug. 18, 2020

(54) COOLING SYSTEM FOR A GALLEY, AND METHOD OF OPERATING SUCH A COOLING SYSTEM (71) Applicant: Airbus Operations GmbH, Hamburg (DE)

(72) Inventor: Torsten Truemper, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 141 days.

(21) Appl. No.: 15/830,404

(22) Filed: Dec. 4, 2017

(65) Prior Publication Data
US 2018/0093774 A1    Apr. 5, 2018

Related U.S. Application Data (63) Continuation of application No. PCT/EP2016/062497, filed on Jun. 2, 2016.

(30) Foreign Application Priority Data

Jun. 3, 2015 (DE) .......................... 10 2015 210268
Jun. 3, 2015 (DE) .......................... 10 2015 210269
Jun. 3, 2015 (DE) .......................... 10 2015 210271

(51) Int. Cl.
*B64D 11/04* (2006.01)
*B64D 13/08* (2006.01)
*B64D 13/06* (2006.01)

(52) U.S. Cl.
CPC .............. *B64D 11/04* (2013.01); *B64D 13/08* (2013.01); *B64D 2013/0629* (2013.01);
(Continued)

(58) Field of Classification Search
CPC ................................. B64D 11/04; B64D 13/08; B64D 2013/0655; B64D 2013/0629;
(Continued)

(56) References Cited

U.S. PATENT DOCUMENTS 4,361,014 A    11/1982 Blain
4,969,509 A    11/1990 Merensky
(Continued)

FOREIGN PATENT DOCUMENTS

DE    3209492    10/1982
DE    3812739    7/1989
(Continued)

OTHER PUBLICATIONS

International Search Report, dated Sep. 6, 2016, priority document.
(Continued)

*Primary Examiner* — Ana M Vazquez
(74) *Attorney, Agent, or Firm* — Greer, Burns & Crain, Ltd.

(57) ABSTRACT

A cooling system for a galley installed in a transportation device, in particular an aircraft, has a cooling device with a coolant circuit configured to have a coolant flow therethrough. A fluid line is configured to have a fluid to be cooled flow therethrough and is thermally coupled with the coolant circuit to transfer heat from the fluid to be cooled to the coolant circulating in the coolant circuit, and an air line configured to be flowed through with air and thermally coupled to the coolant circuit of the cooling device to transfer heat from the coolant to the air line. The air line, downstream of the thermal coupling of the air line with the coolant circuit, is connectable to a cabin region of the transportation device accommodating the galley to supply the cabin region with air warmed by heat transfer from the coolant circulating in the coolant circuit.

8 Claims, 3 Drawing Sheets

(52) U.S. Cl.
CPC ............................ *B64D 2013/0655* (2013.01);
*F25B 2339/047* (2013.01); *F25B 2600/112*
(2013.01); *F25B 2600/2511* (2013.01); *F25B
2700/21173* (2013.01); *Y02T 50/44* (2013.01);
*Y02T 50/46* (2013.01); *Y02T 50/56* (2013.01)

(58) Field of Classification Search
CPC .... F25B 2700/21173; F25B 2600/2511; F25B 2600/112; Y02T 50/56
See application file for complete search history.

(56) References Cited

U.S. PATENT DOCUMENTS

| | | | |
|---|---|---|---|
| 5,513,500 | A | 5/1996 | Fischer et al. |
| 7,780,114 | B2 | 8/2010 | Doebertin et al. |
| 7,802,732 | B2 | 9/2010 | Scherer et al. |
| 9,957,050 | B2 * | 5/2018 | Moran .................. B64D 13/00 |
| 2005/0061012 | A1 | 3/2005 | Zywiak et al. |
| 2007/0119584 | A1 | 5/2007 | Scherer et al. |
| 2007/0137234 | A1 * | 6/2007 | Zywiak ............... B64D 13/06 62/239 |
| 2008/0001031 | A1 | 1/2008 | Doebertin et al. |
| 2009/0000329 | A1 | 1/2009 | Colberg et al. |
| 2011/0067838 | A1 | 3/2011 | Soenmez et al. |
| 2012/0025679 | A1 | 2/2012 | Roering |
| 2013/0047657 | A1 | 2/2013 | Oswald et al. |
| 2013/0076214 | A1 | 3/2013 | Chamberlin et al. |
| 2014/0298824 | A1 | 10/2014 | Truemper et al. |
| 2015/0007600 | A1 | 1/2015 | Godecker et al. |
| 2015/0059384 | A1 | 3/2015 | Burd et al. |
| 2015/0059385 | A1 | 3/2015 | Burd |
| 2015/0089968 | A1 | 4/2015 | Lu et al. |
| 2015/0151842 | A1 | 6/2015 | Weixler |

FOREIGN PATENT DOCUMENTS

| | | |
|---|---|---|
| DE | 4340317 | 6/1995 |
| DE | 19733934 | 7/1998 |
| DE | 102006023047 | 11/2007 |
| DE | 602004010166 | 8/2008 |
| DE | 102008023636 | 12/2009 |
| DE | 102010031909 | 1/2012 |
| DE | 102013005595 | 10/2014 |
| DE | 102013005596 | 10/2014 |
| EP | 1701884 | 9/2006 |
| EP | 2799343 | 11/2014 |
| WO | 2012040564 | 3/2012 |
| WO | 2013033439 | 3/2013 |
| WO | 2014012746 | 1/2014 |
| WO | 2015003073 | 1/2015 |
| WO | 2015031539 | 3/2015 |
| WO | 2015031658 | 3/2015 |
| WO | 2015050971 | 4/2015 |

OTHER PUBLICATIONS

German Search Report, dated May 13, 2016 priority document 102015210268.8.
German Search Report, dated May 2, 2016-05-02 priority document 102015210269.6.
German Search Report, dated May 10, 2016 priority document 102015210271.8.

* cited by examiner

COOLING SYSTEM FOR A GALLEY, AND METHOD OF OPERATING SUCH A COOLING SYSTEM

CROSS-REFERENCES TO RELATED APPLICATIONS

This application is a continuation of International Application PCT/EP2016/062497 filed Jun. 2, 2016, designating the United States and published on Dec. 8, 2016 as WO 2016/193372. This application also claims the benefit of the German patent application Nos. 10 2015 210 268.8, 10 2015 210 269.6, and 10 2015 210 271.8 all filed on Jun. 3, 2015. The entire disclosures of the above are incorporated herein by way of reference.

BACKGROUND OF THE INVENTION

The invention relates to a cooling system for a galley for installation in a transportation means, in particular an aircraft, and to a method of operating such a cooling system. The invention relates further to a galley equipped with such a cooling system.

The cabin of a modern commercial aircraft is conventionally divided into different temperature zones, which are supplied with air-conditioning air, as required, by an air-conditioning system of the aircraft. Typical temperature zones of an aircraft cabin are, for example, a first-class region, a business class region and an economy class region. The operation of an air-conditioning unit of the aircraft air-conditioning system is conventionally controlled in dependence on the cooling requirement of the temperature zone having the highest cooling requirement, that is to say the air-conditioning unit provides cooled process air having a temperature which is sufficiently low to cool the temperature zone with the greatest heat load—which is generally the economy class region of the cabin—to a comfortable temperature. For example, operation of the air-conditioning unit is so controlled that it provides cooled process air having a temperature of 10-12° C.

In order to be able to set a comfortable temperature even in temperature zones with a low heat load, a corresponding amount of hot engine bleed air is mixed with the cooled process air provided by the air-conditioning unit, before the air is finally blown into the temperature zone. Alternatively, the cooled process air provided by the air-conditioning unit can be heated to the desired temperature by means of an electric heating device before it is supplied to a temperature zone. These situations are described, for example, in EP 1 701 884 B1 or U.S. Pat. No. 7,802,732 B2.

Work regions provided in the region of the doors of the aircraft cabin, in which the aircraft galleys are also arranged, are cabin regions with a particularly low heat load, because there is usually only a small number of people in those regions. Typical galleys, for example known from DE 10 2006 023 047 B4 or U.S. Pat. No. 7,780,114 B2, have a corpus having a base structure delimited by a worktop and overhead cabinets arranged above the worktop. Kitchen equipment such as, for example, coffee machines, water boilers, ovens, etc., as well as drinks and foodstuffs, are usually stored in the overhead cabinets of the galley. In the base structure of the galley, on the other hand, there is arranged a galley compartment, which is conventionally cooled, for accommodating movable trolleys which are loaded with items, such as, for example, drinks and foodstuffs, which are to be served to the passengers on board the aircraft.

Cooled galley regions, such as, for example, cooled galley compartments suitable for accommodating movable trolleys, give off cooling energy to the surroundings. In addition, cooling energy is also supplied to the work regions of an aircraft cabin via cold inside surfaces of the aircraft doors. The air-conditioning air supplied to the work regions of the aircraft cabin by the aircraft air-conditioning system must therefore conventionally be heated by means of corresponding heating devices, as are described, for example, in EP 1 701 884 B1 or U.S. Pat. No. 7,802,732 B2, to a temperature which is increased significantly as compared with the temperature of the cooled process air provided by the air-conditioning unit of the aircraft air-conditioning system in order to allow a comfortable ambient temperature to be established in the work regions of the aircraft cabin.

DE 10 2013 005 595 A1 describes an aircraft air-conditioning system having an air-conditioning unit which is configured to provide cooled process air, a process air line which is configured to guide cooled process air provided by the air-conditioning unit into a work region of an aircraft cabin, and a cooler which is configured to supply cooling energy to a device to be cooled that is provided in the work region of the aircraft cabin. A heat transfer arrangement serves to transfer waste heat generated by the cooler to the process air flowing through the process air line.

SUMMARY OF THE INVENTION

An object underlying the invention is to provide a cooling system for a galley and a method of operating such a cooling system which allow the temperature of an aircraft cabin region in the vicinity of the galley to be controlled in an energy-efficient manner. A further object underlying the invention is to provide a galley equipped with such a cooling system.

A cooling system for a galley which is suitable for installation in a transportation means, in particular an aircraft, comprises a cooling device which comprises a coolant circuit through which a coolant can flow. The coolant circulating in the coolant circuit of the cooling device may be a gaseous or liquid coolant but is preferably a two-phase coolant which is converted from the liquid state to the gaseous state when it takes up heat from a cooling energy consumer and is then converted back into the liquid state again. Accordingly, there may be provided in the coolant circuit of the cooling device an evaporator, in which the two-phase coolant is converted from the liquid state to the gaseous state while taking up heat, and a condenser, in which the two-phase coolant is converted from the gaseous state back into the liquid state again while giving off heat. The cooling device may be in the form of a cooling station which is connected to a central cooling system of the transportation means and is supplied with energy by a central installation for cold production. Alternatively, however, the cooling device may also be in the form of an independent cooling device and, in particular, in the form of an air chiller.

The cooling system further comprises a fluid line which is configured to be flowed through with a fluid to be cooled and which is thermally coupled with the coolant circuit of the cooling device in order to transfer heat from the fluid to be cooled flowing through the fluid line to the coolant circulating in the coolant circuit. In particular when the cooling device is in the form of an air chiller, the fluid flowing through the fluid line is preferably air.

The cooling system further comprises an air line which is adapted to be flowed through with air and which is thermally coupled with the coolant circuit of the cooling device in order to transfer heat from the coolant circulating in the coolant circuit to the air flowing through the air line. Accordingly, the air flowing through the air line takes up heat from the coolant circulating in the coolant circuit of the cooling device and thereby cools the coolant to a lower temperature.

The air line, downstream of the thermal coupling of the air line with the coolant circuit of the cooling device, is connectable to a cabin region of the transportation means accommodating the galley, in order to supply the cabin region with air warmed by heat transfer from the coolant circulating in the coolant circuit of the cooling device. Consequently, in the cooling system, air which has been warmed to temperatures of, for example, from 25 to 40° C. by heat transfer from the coolant circulating in the coolant circuit of the cooling device can be used to heat the cabin region accommodating the galley. The energy outlay required for additionally heating the cabin region accommodating the galley can thereby be minimized.

Thermal coupling between the coolant circuit of the cooling device and the fluid line can be established, for example, by means of a first heat exchanger. When a two-phase coolant is circulating in the coolant circuit of the cooling device, the first heat exchanger is preferably in the form of an evaporator, so that the fluid line can then be thermally coupled with the coolant circuit of the cooling device via that evaporator. Similarly, thermal coupling between the coolant circuit of the cooling device and the air line can be established by means of a second heat exchanger. When a two-phase coolant is circulating in the coolant circuit of the cooling device, the second heat exchanger is preferably in the form of a condenser, so that the air line can then be thermally coupled with the coolant circuit of the cooling device via that condenser.

In a preferred embodiment of the cooling system, the air line, downstream of the thermal coupling of the air line with the coolant circuit of the cooling device, relative to the direction of flow of the air through the air line, is connectable to an intermediate deck of the transportation means in order to supply the intermediate deck with air warmed by heat transfer from the coolant circulating in the coolant circuit of the cooling device. The intermediate deck may be provided between the floor of the cabin and the ceiling of a cargo region of an aircraft equipped with the cooling system. The air may be guided further from the intermediate deck into triangle areas of the aircraft and then be discharged from the aircraft into the environment, e.g. via an outflow valve of the aircraft. Alternatively or additionally thereto, the air line, downstream of the thermal coupling of the air line with the coolant circuit of the cooling device, may also be connectable to an air discharge line which serves to discharge cabin air from the aircraft and which may be connected to the outflow valve of the aircraft.

When the air line is connectable, not only to the cabin region accommodating the galley, but also to the intermediate deck and/or the air discharge line of the transportation means, the air warmed by heat transfer from the coolant circulating in the coolant circuit can be guided, as required, either into the cabin region accommodating the galley or into the intermediate deck and/or the air discharge line. It is further possible to guide some of the warmed air into the cabin region accommodating the galley and to conduct the remainder of the warmed air into the intermediate deck and/or the air discharge line. The heat input into the cabin region accommodating the galley can then be controlled in a particularly flexible manner.

Upstream of the thermal coupling of the air line with the coolant circuit of the cooling device, the air line may be connectable to a fresh air line of an air conditioning system in order to supply the air line with air-conditioned fresh air. The air line then is flowed through with cool fresh air which allows a particularly efficient heat transfer from the coolant circulating in the coolant circuit of the cooling device to the cool fresh air flowing through the air line. Alternatively or additionally, the air line, upstream of the thermal coupling of the air line with the coolant circuit of the cooling device, may be connectable to an interior of the galley in order to supply the air line with air to be discharged from the interior of the galley. If desired, the supply of air-conditioned fresh air to the air line, e.g., by means of a suitable valve, may be controlled in such a manner that the air line is flowed through with a mixture of air-conditioned fresh air and air to be discharged from the interior of the galley.

The cooling system preferably further comprises a valve which is configured to control the volume flow of the air warmed by heat transfer from the coolant circulating in the coolant circuit into the cabin region of the transportation means accommodating the galley. Relative to the direction of flow of the air through the air line, the valve is preferably arranged in the air line downstream of the thermal coupling of the air line with the coolant circuit of the cooling device. The valve may be in the form of a flap, for example, which may be brought into different positions by means of a controllable actuator. Depending on the position of the valve, a desired volume flow of warm air can then be guided into the cabin region accommodating the galley. The valve may further be configured to guide the warm air, as required and optionally also proportionately with a desired volume flow, into the cabin region accommodating the galley or into the intermediate deck and/or the air discharge line of the transportation means.

The cooling system may further comprise a feed device for feeding air through the air line. The feed device may be in the form of a fan and may be arranged in the air line downstream of the thermal coupling of the air line with the coolant circuit of the cooling device, relative to the direction of flow of the air through the air line. If desired, a further feed device may be provided for feeding air from the air line into and through the air discharge line in the direction of the outflow valve.

The cooling system may further comprise a temperature sensor for detecting an actual temperature in the cabin region accommodating the galley. The temperature sensor may be mounted, for example, in a front region of the galley in order to measure the temperature in a region occupied by the cabin personnel working in the galley. It is, however, also conceivable to integrate the temperature sensor into the cooling device. The cooling system may further be equipped with a setting device for setting a desired temperature in the cabin region accommodating the galley. The setting device may be in the form of a manually operable interface, for example, which, like the temperature sensor, may be mounted in a front region of the galley. Alternatively, however, it is also possible to integrate the setting device into the cooling device and/or to configure the setting device in the form of software or hardware in such a manner that it sets the desired temperature in the cabin region accommodating the galley automatically, that is to say, without manual input being required. Finally, the desired temperature may also be set by a central temperature control system of the aircraft and fed to the cooling system via a suitable bus system, for example a CAN bus system.

In a preferred embodiment, the cooling system further comprises a control unit which is configured to control the operation of the valve arranged in the air line, the operation of the feed device for feeding air through the air line and/or the operation of the cooling device in dependence on the actual temperature detected by the temperature sensor and/or the desired temperature set by the setting device or the central temperature control system of the aircraft in the cabin region accommodating the galley. By correspondingly controlling the feed device, it is possible to control the temperature of the air flowing through the air line. The operation of the valve, of the feed device and/or of the cooling device is preferably so controlled that the actual temperature in the cabin region accommodating the galley is approximately the same as the desired temperature set by the setting device.

By correspondingly controlling the valve arranged in the air line, a desired partial volume flow of the warm air stream flowing through the air line downstream of the thermal coupling of the air line with the coolant circuit of the cooling device, can be guided into the cabin region accommodating the galley. For example, by correspondingly controlling the valve, the warm air stream flowing through the air line can be distributed, as required, to the cabin region accommodating the galley and to the intermediate deck and/or the air discharge line of the transportation means. By means of the valve, the volume flow of the warmed air into the cabin region of the transportation means accommodating the galley can thus be controlled as desired. Corresponding control of the feed device for feeding air through the air line allows the volume flow of warm air through the air line to be reduced or increased, as required, and consequently allows the temperature of the air stream flowing through the air line to be controlled.

Finally, by correspondingly controlling the cooling device, the temperature of the warm air flowing through the air line downstream of the thermal coupling of the air line with the coolant circuit of the cooling device can be adjusted as desired. In the case of a high heat requirement in the cabin region accommodating the galley, it is consequently even conceivable to operate the cooling device with a cooling capacity that is above the cooling capacity requirement made of the cooling device. In operating situations in which the cooling device does not have to provide any cooling capacity, the cooling device can be operated as a heat pump, that is to say, the cooling device can be used solely for heating the cabin region accommodating the galley.

The fluid line and/or the air line of the cooling system may comprise a portion integrated into a worktop of the galley. The worktop of the galley may separate a base structure of the galley from overhead cabinets of the galley. The cooling system is then distinguished by a particularly space-saving design, it being possible for the space saved by integrating a fluid line and/or air line portion into the worktop of the galley advantageously to be used, for example, for integrating the cooling device into the galley, in particular into the base structure of the galley. It is, however, also conceivable to arrange the fluid line and/or the air line of the cooling system adjacent to the worktop. In particular, the fluid line and/or the air line may be arranged either below a lower surface of the worktop which faces an interior space of base structure of the galley or above an upper surface of the worktop which faces away from the interior space of base structure of the galley.

In a method of operating a cooling system for a galley for installation in a transportation means, in particular an aircraft, a coolant is guided through a coolant circuit of a cooling device. A fluid to be cooled is guided through a fluid line which is thermally coupled with the coolant circuit of the cooling device, in order to transfer heat from the fluid to be cooled flowing through the fluid line to the coolant circulating in the coolant circuit. Furthermore, air is guided through an air line which is thermally coupled with the coolant circuit of the cooling device, in order to transfer heat from the coolant circulating in the coolant circuit to the air flowing through the air line. The air line is connected downstream of the thermal coupling of the air line with the coolant circuit of the cooling device to a cabin region of the transportation means accommodating the galley, in order to supply the cabin region with air warmed by heat transfer from the coolant circulating in the coolant circuit.

The fluid line is preferably thermally coupled with the coolant circuit of the cooling device via an evaporator. In addition or alternatively, the air line may be thermally coupled with the coolant circuit of the cooling device via a condenser.

In a preferred embodiment of the method, the air line, downstream of the thermal coupling of the air line with the coolant circuit of the cooling device, is connected to an intermediate deck of the transportation means, in order to supply the intermediate deck with air warmed by heat transfer from the coolant circulating in the coolant circuit of the cooling device.

Upstream of the thermal coupling of the air line with the coolant circuit of the cooling device, the air line may be connected to a fresh air line of an air conditioning system in order to supply the air line with air-conditioned fresh air. Alternatively or additionally, the air line, upstream of the thermal coupling of the air line with the coolant circuit of the cooling device, may be connected to an interior of the galley in order to supply the air line with air to be discharged from the interior of the galley.

The volume flow of the air warmed by heat transfer from the coolant circulating in the coolant circuit of the cooling device into the cabin region of the transportation means accommodating the galley may be controlled by means of a valve which may be arranged, for example, in the air line downstream of the thermal coupling of the air line with the coolant circuit of the cooling device. Air may be fed through the air line by means of a feed device in the form of a fan, for example.

In a preferred embodiment of the method, an actual temperature in the cabin region accommodating the galley is detected. In addition or alternatively, a desired temperature in the cabin region accommodating the galley may be set.

The operation of the valve arranged in the air line, the operation of the feed device for feeding air through the air line and/or the operation of the cooling device may be controlled in dependence on the actual temperature detected in the cabin region accommodating the galley and/or in dependence on the set desired temperature in the cabin region accommodating the galley.

The fluid to be cooled may be guided through a fluid line which comprises a portion integrated into a worktop of the galley. In addition or alternatively, the air may be guided through an air line which comprises a portion integrated into a worktop of the galley.

A galley suitable for installation in a transportation means comprises a cooling system described above.

A cooling system described above and/or a galley described above is/are particularly advantageously suitable for use in an aircraft.

BRIEF DESCRIPTION OF THE DRAWINGS

A preferred embodiment of the invention will now be described in greater detail with reference to the accompanying schematic drawings, in which.

DETAILED DESCRIPTION OF THE PREFERRED EMBODIMENTS

Figure 1:
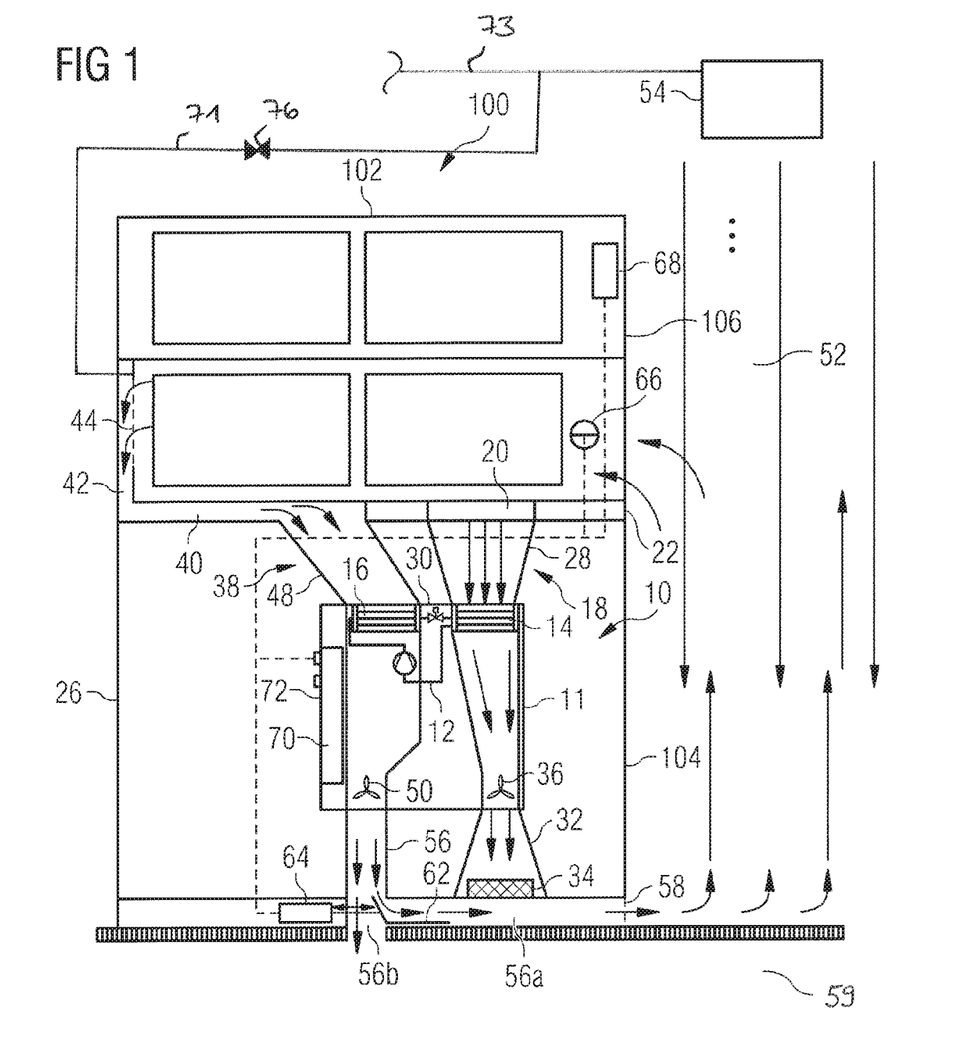
FIG. 1 shows a galley equipped with a first embodiment of a cooling system.

FIG. 1 shows a galley 100 which is suitable, in particular, for installation in a passenger cabin of a commercial aircraft. The galley 100 comprises a corpus 102 having a base structure 104 as well as overhead cabinets 106 arranged above the base structure 104. Kitchen equipment, such as, for example, coffee machines, water boilers, ovens, etc., as well as drinks and foodstuffs are housed in the overhead cabinets 106. In the base structure 104 of the galley 100, on the other hand, there is arranged a trolley compartment for accommodating movable trolleys which are loaded with items, such as, for example, drinks and foodstuffs, which are to be served to the passengers in the passenger cabin of the commercial aircraft. A cooling system 10 serves to cool the trolley compartment arranged in the base structure 104 of the galley 100.

The cooling system 10 comprises a cooling device 11 having a coolant circuit 12 through which a two-phase coolant flows. An evaporator 14 and a condenser 16 are arranged in the coolant circuit 12. When coolant flows through the evaporator 14, the coolant flowing through the coolant circuit 12 takes up heat and is thereby converted from the liquid to the gaseous state of aggregation. By contrast, when the coolant flows through the condenser 16, the coolant flowing through the coolant circuit 12 is cooled by giving off heat energy and is converted from the gaseous back into the liquid state of aggregation again. The cooling device 11 is integrated into an intermediate wall 17 which divides the base structure 104 of the galley 100 into a first and a second portion 104a, 104b.

A fluid to be cooled by means of the cooling device 11 flows through a fluid line 18. In the embodiment of a cooling system 10 shown in the figures, the fluid is air, that is to say, the cooling device 11 is in the form of an air chiller. The fluid line 18 is thermally coupled with the coolant circuit 12 of the cooling device 11 via the evaporator 14, in order to transfer heat from the fluid flowing through the fluid line 18 to the coolant circulating in the coolant circuit 12. The fluid is thus cooled to a desired low temperature as it flows through the evaporator 14.

Figure 2:
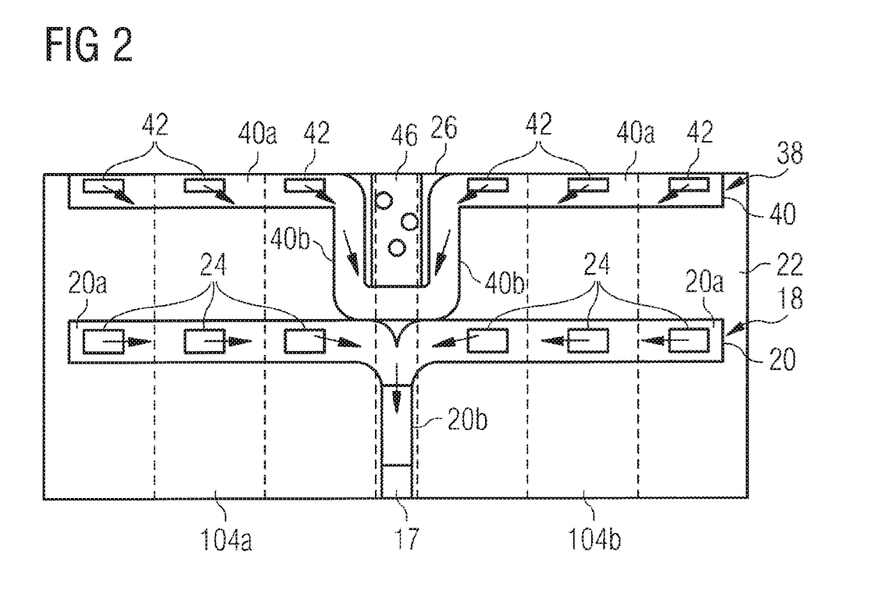
FIG. 2 is a plan view of a worktop of the aircraft galley according to FIG. 1.

The fluid line 18 comprises a first portion 20 shown in FIG. 2 which is integrated in a space-saving manner into a worktop 22 of the galley 100. The worktop 22 separates the base structure 104 of the galley 100 from the overhead cabinets 106 of the galley 100. The first portion 20 of the fluid line 18 is provided with a plurality of fluid inlets 24 which are formed in an underside of the worktop 22 facing the base structure 104 of the galley 100. The fluid inlets 24, in particular, open into two first sub-portions 20a of the first portion 20 of the fluid line 18 which extend substantially parallel to a rear wall 26 of the galley. The two first sub-portions 20a of the first portion 20 of the fluid line 18 in turn open into a second sub-portion 20b of the first portion 20 of the fluid line 18 which extends substantially perpendicularly to the rear wall 26 of the galley 100.

As can be seen in FIG. 1, the second sub-portion 20b of the first portion 20 of the fluid line 18 is connected to a second portion 28 of the fluid line 18 which opens into the cooling device 11 in the region of an upper side 30 of the cooling device 11 facing the worktop 22, and thus produces a connection between the first portion 20 of the fluid line 18 and a portion of the fluid line 18 that is thermally coupled with the coolant circuit 12 of the cooling device 11 via the evaporator 14. A third portion 32 of the fluid line 18 connects the cooling device 11 to two fluid outlets 34 which open into the portions 104a, 104b of the base structure 104 of the galley 100. Fluid cooled by means of the cooling device 11 can thus be guided via the third portion 32 of the fluid line 18 and the fluid outlets 34 into a region of the base structure 104 close to the floor and recirculated into the cooling device 11 again via the first portion 20 and then the second portion 28 of the fluid line 18. The direction of flow of the fluid cooled by the cooling device 11 through the fluid line 18 may, however, also be reversed.

A feed device 36 for feeding fluid through the fluid line 18 may be in the form of a fan, for example, and is integrated into the cooling device 11 in the embodiment of a cooling system 10 shown here. The feed device 36 for feeding fluid through the fluid line 18 is, in particular, arranged in the fluid line 18 downstream of the thermal coupling of the fluid line 18 with the evaporator 14 of the cooling device 11, relative to the direction of flow of the fluid through the fluid line 18.

Air flows through an air line 38. The air line 38 is thermally coupled with the coolant circuit 12 of the cooling device 11 via the condenser 16 in order to transfer heat from the coolant circulating in the coolant circuit 12 to the air flowing through the air line 38. The air flowing through the air line 38 is thus used to cool coolant circulating in the coolant circuit 12.

As can in turn be seen in FIG. 2, the air line 38 also comprises a first portion 40 which is integrated in a space-saving manner into the worktop 22 of the galley 100. The first portion 40 of the air line 38 is provided with a plurality of fluid inlets 42 which are formed adjacent to the rear wall 26 of the galley 100 in an upper side of the worktop 22. Air can thus be discharged from the interior of an overhead cabinet 106 via the fluid inlets 42 and guided through the air line 38. Before being fed into the air line 38, the air discharged from the interior of the overhead cabinet 106 is guided through a filter element 44 which, relative to the direction of flow of the air towards the air line 38, is arranged upstream of the fluid inlets 42 in the region of the rear wall 26 of the galley 100. Since the first portion 40 of the air line 38 is integrated into the worktop 42 of the galley 100 and does not require any installation space in the region of the rear wall 26 of the galley, the filter element 44 can be formed over a large area.

Further, the air line 38, via a connecting line 71, is connected to a fresh air line 73 of an air conditioning system 54. Via the connecting line 71, the air line 38 may be supplied with air-conditioned fresh air, wherein the flow of air-conditioned fresh air from the fresh air line 73 to the air line 38 is controlled by means of a valve 76 which is arranged in the connecting line 71. By appropriately controlling the valve 76, cool fresh air may be guided through the air line 38 which allows a particularly efficient heat transfer from the coolant circulating in the coolant circuit 12 of the cooling device 11 to the cool fresh air flowing through the air line 38. Further, the supply of air-conditioned fresh air to the air line 38, by means of the valve 76, may be controlled in such a manner that the air line 38 is flowed through with a mixture of air-conditioned fresh air and air discharged from the interior of the overhead cabinet 106.

The fluid inlets 42 open into two first sub-portions 40a of the first portion 40 of the air line 38 which extend substantially parallel to the rear wall 26 of the galley. The two first sub-portions 40a of the first portion 40 of the air line 38 in turn each open into a second sub-portion 40b of the first portion 40 of the air line 38. The two second sub-portions 40b of the first portion 40 of the air line 38 extend substantially perpendicularly to the rear wall 26 of the galley 100 and substantially parallel to the intermediate wall 17 at a distance from one another. The air flowing through the air line 38 can be guided via the two second sub-portions 40b of the first portion 40 of the air line 38 towards a cooling device 11 which, as is shown in FIG. 1, is installed at a distance from the rear wall 26 of the galley 100. A gap between the cooling device 11 and the rear wall 26 of the galley 100 can then be used as installation space for supply lines 46 for the galley 100, such as, for example, water lines, vacuum lines or the like. A region of the worktop 22 that remains free between the two second sub-portions 40b of the first portion 40 of the air line 38 can be used to guide the supply lines 46 of the galley 100 through the worktop 22, as is illustrated in FIG. 2.

The air line 38 further comprises a second portion 48 which, relative to the direction of flow of the air through the air line 38, is arranged downstream of the first portion 40 and consequently connects the first portion 40 of the air line 38 to the cooling device 11, that is to say to a portion of the air line 38 that is thermally coupled with the coolant circuit 12 of the cooling device 11. In the arrangement according to FIG. 1, the second portion 48 of the air line 38 opens into the cooling device 11 in the region of the upper side 30 of the cooling device 11 facing the worktop 22.

Like the feed device 36 for feeding fluid through the fluid line 18, a feed device 50 for feeding air through the air line 38 can also be in the form of a fan. In the embodiment shown here of a cooling system 10, the feed device 50 for feeding air through the air line 38 is integrated into the cooling device 11 and, relative to the direction of flow of the air through the air line 38, is arranged in the air line 38 downstream of the thermal coupling of the air line 38 with the condenser 16 of the cooling device 11. Corresponding control of the feed device 50 for feeding air through the air line 38 allows the volume flow of warm air through the air line 38 to be reduced or increased as required, and consequently allows the temperature of the air stream flowing through the air line 38 to be controlled.

Relative to the direction of flow of the air through the air line 38, downstream of the thermal coupling of the air line 38 with the coolant circuit 12 of the cooling device 11, the air line 38, can be connected to a cabin region 52 of the aircraft accommodating the galley 100, in order to supply the cabin region 52 with air warmed by heat transfer from the coolant circulating in the coolant circuit 12 of the cooling device 11. The warm air flowing through the air line 38 can accordingly be used to heat the cabin region 52, to which cold air-conditioning air having a temperature of about 12° C. is supplied by the aircraft air-conditioning system 54 and at which, moreover, cooling energy is also given off from cold surfaces of the cooled base structure 104 of the galley 100 as well as from cold inside surfaces of aircraft doors (not shown). The energy outlay for additional heating of the cabin region 52, which is necessary in order to create comfortable working conditions in the cabin region 52 for the cabin personnel, can thus be minimized.

To that end, the air line 38 has a third portion 56 which, relative to the direction of flow of the air through the air line 38, is arranged downstream of the cooling device 11. The third portion 56 of the air line 38 branches into a first sub-portion 56a and a second sub-portion 56b. The first sub-portion 56a of the third portion 56 of the air line 38 opens into an air outlet 58 which is arranged in the region of a front side of the galley 100 and via which the warm air flowing through the air line 38 can be guided into the cabin region 52 close to the floor. Air leaving the air outlet 58 then rises in the cabin region 52 as a result of natural convection and mixes with the cold air supplied by the aircraft air-conditioning system 54. If desired, the air outlet 58 may be covered with a grille which may have adjustable baffle plates. The air leaving the air outlet 58 can then be deflected as desired, that is to say blown into the cabin region 52 in a desired direction. Furthermore, a filter, in particular an active charcoal filter for filtering unpleasant odors from the air flowing through the air line, may be provided in the third portion 56 of the air line 38.

Via the second sub-portion 56b, on the other hand, the air line 38 can be connected to an intermediate deck 59 of the aircraft, so that warm air flowing through the air line 38 can also be supplied to the intermediate deck 59 of the aircraft. In the region in which the third portion 56 of the air line 38 branches into the first and second sub-portions 56a, 56b, a valve 62 is arranged in the air line 38. The valve 62 is configured to control the volume flow of warm air flowing through the air line 38 into the cabin region 52 accommodating the galley 100 and/or into the intermediate deck 59 as desired.

Figure 3:
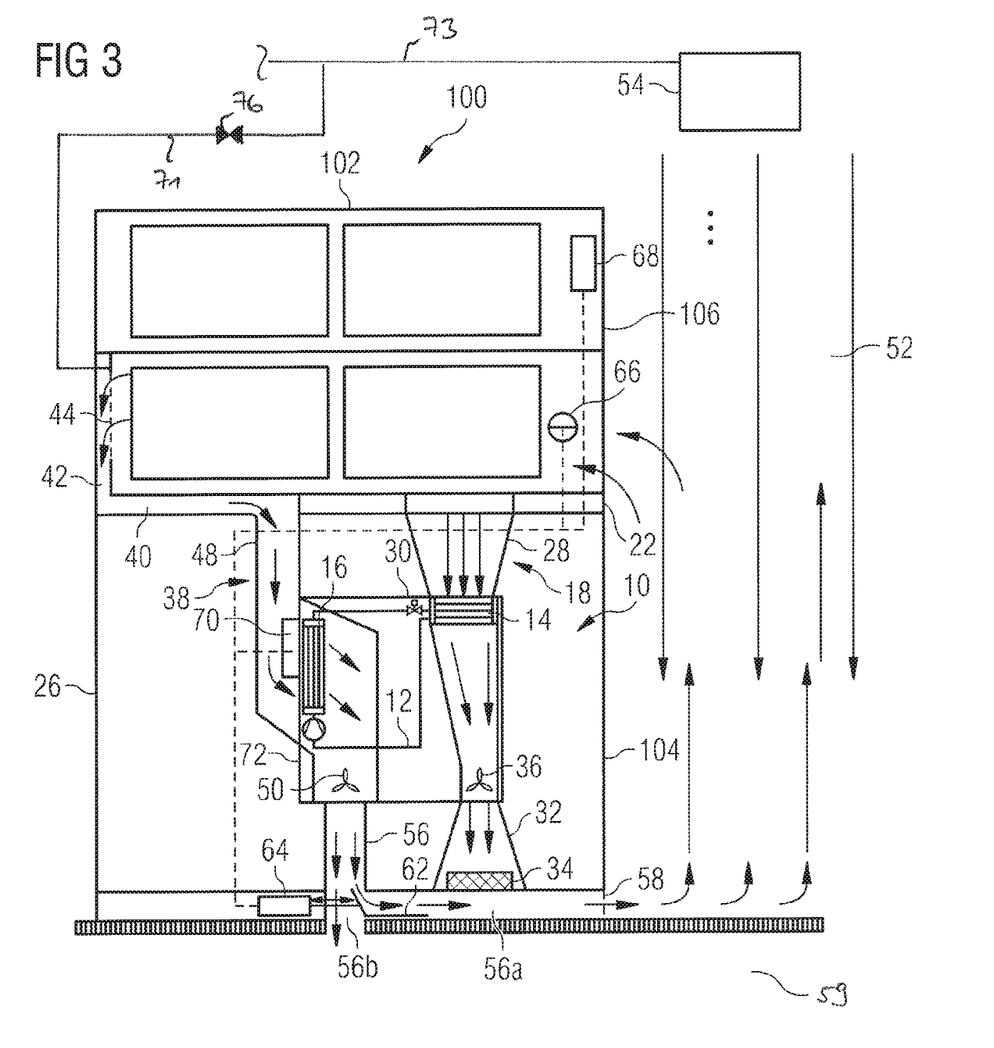
FIG. 3 shows a galley equipped with an alternative embodiment of a cooling system.

In the embodiments of a cooling system 10 shown in the figures, the valve 62 is in the form of a flap which can be actuated by means of a controllable actuator 64. Depending on the position of the valve 62, the warm air flowing through the air line 38 can be guided either solely into the cabin region 52 or solely into the intermediate deck 59. Alternatively, the air stream flowing through the air line 38 can, however, also be divided by the valve 62 into partial volume flows which can then be supplied to the cabin region 52 and the intermediate deck 59 as required.

A temperature sensor 66 provided in the region of the front side of the galley 100 serves to detect the actual temperature in the cabin region 52 accommodating the galley 100. Furthermore, a setting device 68 for setting a desired temperature in the cabin region 52 is mounted in the region of the front side of the galley 100. In the embodiments of a cooling system 10 shown in the figures, the setting device 68 is in the form of a manually operable interface. Signals emitted by the temperature sensor 66 and by the setting device 68 are fed to an electronic control unit 70. Alternatively, the desired temperature can also be set by a central temperature control system of the aircraft and fed to the cooling system 10 via a suitable bus system, for example a CAN bus system. The electronic control unit 70 is configured to control the operation of the valve 62 arranged in the air line 38, the operation of the feed device 50 for feeding air through the air line 38, the operation of the valve 76 arranged in the connecting line 71 and the operation of the cooling device 11 in dependence on the signals emitted by the temperature sensor 66 and the setting device 68, that is to say, in dependence on the actual temperature in the cabin region 52 accommodating the galley 100 detected by the temperature sensor 66 and in dependence on the desired temperature in the cabin region 52 set by the setting device 68 or the central temperature control system of the aircraft. In particular, the electronic control unit 70 controls the operation of the valve 62 arranged in the air line 38, the operation of the feed device 50 for feeding air through the air line 38, the operation of the valve 76 arranged in the connecting line 71 and the operation of the cooling device 11 in such a manner that the actual temperature in the cabin region 52 is approximately the same as the desired temperature and comfortable temperatures are thereby achieved in the cabin region 52.

In the case of a high heat requirement in the cabin region 52 accommodating the galley, it is conceivable to operate the cooling device 11 with a cooling capacity that is above the cooling capacity requirement made of the cooling device 11. In operating situations in which the cooling device 11 does not have to provide a cooling capacity, the cooling device 11 can be operated as a heat pump, that is to say, the cooling device 11 can be used solely for heating the cabin region 52 accommodating the galley. A flap can then be arranged in the second portion 28 of the fluid line 18, which flap can be opened as required in order to allow air to be drawn from the base structure 104 into the fluid line 18. Warm ambient air then flows in through non-tight regions that exist in the base structure 104, whereby it is ensured that sufficient warm ambient air is supplied to the fluid line 18 to allow the cooling device 11 to be operated as a heat pump.

The galley 100 shown in FIG. 3 differs from the arrangement according to FIG. 1 only in that the second portion 48 of the air line 38 opens into the cooling device 11 not in the region of the upper side 30 of the cooling device 11 facing the worktop 22 but in the region of a rear side 72 facing the rear wall 26 of the galley 100. Connecting the second portion 48 of the air line 38 to the cooling device in the region of the upper side 30 of the cooling device 11 allows the installation space available between the rear side 72 of the cooling device 11 and the rear wall 26 of the galley 100 for installation of the supply lines 46 for the galley 100 to be maximized. Connecting the second portion 48 of the air line 38 to the cooling device 11 in the region of the rear side 72 of the cooling device 11, on the other hand, allows the heat exchange surfaces between the air line 38 and the coolant circuit 12 of the cooling device 11 to be maximized, thus allowing the cooling capacity of the cooling device 11 to be increased.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cooling system for a galley for installation in a transportation means, comprising:
   a cooling device which comprises a coolant circuit configured to be flowed through with a coolant,
   a fluid line which is configured to be flowed through with a fluid to be cooled and which is thermally coupled with the coolant circuit of the cooling device in order to transfer heat from the fluid to be cooled flowing through the fluid line to the coolant circulating in the coolant circuit,
   an air line which is adapted to be flowed through with air and which is thermally coupled with the coolant circuit of the cooling device in order to transfer heat from the coolant circulating in the coolant circuit to the air flowing through the air line,
   wherein the air line, downstream of the thermal coupling of the air line with the coolant circuit of the cooling device, is connectable to a cabin region of the transportation means accommodating the galley in order to supply the cabin region with air warmed by heat transfer from the coolant circulating in the coolant circuit of the cooling device,
   wherein the galley forms a housing and at least one of the fluid line and the air line comprises a portion integrated into a worktop of the housing.

2. The cooling system according to claim 1, wherein at least one of the fluid line is thermally coupled with the coolant circuit of the cooling device via an evaporator, or
   the air line is thermally coupled with the coolant circuit of the cooling device via a condenser.

3. The cooling system according to claim 1, wherein at least one of
   the air line, downstream of the thermal coupling of the air line with the coolant circuit of the cooling device, is connectable to an intermediate deck of the transportation means in order to supply the intermediate deck with air warmed by heat transfer from the coolant circulating in the coolant circuit of the cooling device, or
   the air line, upstream of the thermal coupling of the air line with the coolant circuit of the cooling device, is connectable to a fresh air line to supply the air line with air-conditioned fresh air.

4. The cooling system according to claim 1, further comprising at least one of:
   a valve arranged in the air line downstream of the thermal coupling of the air line with the coolant circuit of the cooling device, which valve is configured to control the volume flow of the air warmed by heat transfer from the coolant circulating in the coolant circuit into the cabin region of the transportation means accommodating the galley, or
   a feed device for feeding air through the air line.

5. The cooling system according to claim 4, further comprising at least one of:
   a temperature sensor for detecting an actual temperature in the cabin region accommodating the galley, or
   a setting device for setting a desired temperature in the cabin region accommodating the galley, and
   further comprising at least one of:
   a control unit configured to control the operation of at least one of
      the valve arranged in the air line,
      the feed device for feeding air through the air line, or
      the cooling device in dependence on at least one of:
         the actual temperature detected by the temperature sensor in the cabin region accommodating the galley, or
         the desired temperature in the cabin region accommodating the galley set by the setting device or by a central temperature controller of the aircraft.

6. The cooling system according to claim 1, further comprising at least one of:

a temperature sensor for detecting an actual temperature in the cabin region accommodating the galley, or a setting device for setting a desired temperature in the cabin region accommodating the galley.

7. A galley comprising a cooling system according to claim 1.

8. The cooling system according to claim 1, wherein the air line, upstream of the thermal coupling of the air line with the coolant circuit of the cooling device, is connectable to an interior of the galley in order to supply the air line with air to be discharged from the interior of the galley.

* * * * *